(12) United States Patent
Rye et al.

(10) Patent No.: US 8,966,384 B2
(45) Date of Patent: Feb. 24, 2015

(54) APPARATUS AND METHOD FOR DISPLAYING ENERGY-RELATED INFORMATION

(75) Inventors: Jeffrey M. Rye, Minneapolis, MN (US); Wendy K. Foslien, Woodbury, MN (US); Steven D. Gabel, Golden Valley, MN (US); Geoffrey Ho, Toronto (CA); Karel Marik, Revnice (CZ); Josef Rieger, Jilemnice (CZ)

(73) Assignee: Honeywell International Inc., Morristown, NJ (US)

( * ) Notice: Subject to any disclaimer, the term of this patent is extended or adjusted under 35 U.S.C. 154(b) by 702 days.

(21) Appl. No.: 12/259,959

(22) Filed: Oct. 28, 2008

(65) Prior Publication Data

US 2009/0125825 A1    May 14, 2009

Related U.S. Application Data

(60) Provisional application No. 60/987,143, filed on Nov. 12, 2007.

(51) Int. Cl.
*G06F 3/048* (2013.01)
*G05B 23/02* (2006.01)

(52) U.S. Cl.
CPC .................................. *G05B 23/0216* (2013.01)
USPC ....................................................... 715/764

(58) Field of Classification Search
USPC ....................................................... 715/853
See application file for complete search history.

(56) References Cited

U.S. PATENT DOCUMENTS

| | | | |
|---|---|---|---|
| 4,939,922 A * | 7/1990 | Smalley et al. | 73/10 |
| 5,566,084 A * | 10/1996 | Cmar | 700/276 |
| 5,777,598 A | 7/1998 | Gowda et al. | |
| 6,429,868 B1 | 8/2002 | Dehner, Jr. et al. | |
| 6,473,084 B1 | 10/2002 | Phillips et al. | |
| 6,704,012 B1 | 3/2004 | Lefave | |
| 6,801,199 B1 | 10/2004 | Wallman | |
| 7,023,440 B1 * | 4/2006 | Havekost et al. | 345/440 |
| 7,557,729 B2 * | 7/2009 | Hubbard et al. | 340/870.02 |
| 2002/0116155 A1 * | 8/2002 | Mayer et al. | 702/188 |
| 2002/0130868 A1 | 9/2002 | Smith | |

(Continued)

OTHER PUBLICATIONS

Jeffrey Ball, "Green Goal of 'Carbon Neutrality' Hits Limit", The Wall Street Journal, Dec. 30, 2008, 7 pages.

(Continued)

*Primary Examiner* — Omar Abdul-Ali
*Assistant Examiner* — Haimei Jiang

(57) ABSTRACT

A method includes receiving energy-related information associated with multiple elements in a hierarchically-arranged domain. The method also includes determining a value of an energy-related metric for each of the elements using the energy-related information. The method further includes generating a graphical user interface using the metric values and presenting the graphical user interface to a user. The graphical user interface includes a treemap having multiple sections, each associated with one of the elements. The graphical user interface also includes a graph displaying energy-related information associated with a selected element. A size of each section in the treemap could be based on a size, importance, energy usage, and/or carbon emission of the associated element. A color and a color intensity of each section in the treemap could be based on the metric value of the associated element and/or a comparison of the absolute energy usage to a baseline.

20 Claims, 15 Drawing Sheets

(56) References Cited

U.S. PATENT DOCUMENTS

| | | | |
|---|---|---|---|
| 2003/0028269 A1* | 2/2003 | Spriggs et al. | 700/83 |
| 2003/0046862 A1* | 3/2003 | Wolf et al. | 44/447 |
| 2003/0071814 A1 | 4/2003 | Jou et al. | |
| 2003/0193502 A1 | 10/2003 | Patel et al. | |
| 2004/0168115 A1* | 8/2004 | Bauernschmidt et al. | 715/500 |
| 2006/0020177 A1* | 1/2006 | Seo et al. | 600/300 |
| 2006/0178124 A1* | 8/2006 | Sugar | 455/226.1 |
| 2006/0184326 A1* | 8/2006 | McNally et al. | 702/3 |
| 2007/0088534 A1 | 4/2007 | MacArthur et al. | |
| 2007/0090951 A1* | 4/2007 | Chan et al. | 340/572.1 |
| 2007/0091091 A1 | 4/2007 | Gardiner et al. | |
| 2007/0216682 A1 | 9/2007 | Navratil et al. | |
| 2007/0268122 A1 | 11/2007 | Kow et al. | |
| 2008/0027885 A1* | 1/2008 | van Putten et al. | 705/412 |
| 2009/0149981 A1* | 6/2009 | Evans et al. | 700/110 |
| 2010/0223198 A1* | 9/2010 | Noureldin et al. | 705/348 |
| 2010/0287512 A1* | 11/2010 | Gan et al. | 715/854 |

OTHER PUBLICATIONS

"Web Based Energy Information Systems for Energy Management and Demand Response in Commercial Buildings", California Energy Commission, Oct. 2003, 80 pages.

"Energy Manager User Guide" Release 3.2, Honeywell, 2008, 180 pages.

"Vykon Energy Suite Student Guide", Tridium, Inc., Mar. 3, 2006, 307 pages.

Michael B. Bell, et al., "Early Event Detection-Results From a Prototype Implementation", AICHE Spring National Meeting, Apr. 2005, 15 pages.

Tony F. Chen, "Rank Revealing QR Factorizations", Linear Algebra and It's Applications, vol. 88-89, Apr. 1987, p. 67-82.

Theodora Kourti, "Process Analysis and Abnormal Situation Detection: From Theory to Practice", IEEE Control Systems Magazine, Oct. 2002, p. 10-25.

Don Morrison, et al., "The Early Event Detection Toolkit", Honeywell Process Solutions, Jan. 2006, 14 pages.

"Fuzzy Logic Toolbox 2.1, Design and simulate fuzzy logic systems", The MathWorks, May 2004, 2 pages.

"Model Predictive Control Toolbox 2, Develop internal model-based controllers for constrained multivariable processes", The MathWorks, Mar. 2005, 4 pages.

"Product Guide", Honeywell, 2004, 127 pages.

"Statistics Toolbox, for Use with Matlab" User's Guide Version 2, The MathWorks, Jan. 1999, 408 pages.

"ASHRAE Dashboard Research Project", Aug. 28, 2008, 29 pages.

"Junk Charts, Recycling chartjunk as junk art", Oct. 2, 2006, 3 pages.

Richard Rogan, et al., Chapter 6, "Smart and Final Food Stores: A Case Study in Web Based Energy Information and Collection", Web Based Energy Information and Control Systems: Case Studies and Application, 2005, p. 59-64.

Paul A. Mathew, Ph.D., "Action-Oriented Benchmarking, Using CEUS Date to Identify and Prioritize Efficiency Oppertunites in California Commercial Buildings", Jun. 2007, 26 pages.

* cited by examiner

FIG. 7

APPARATUS AND METHOD FOR DISPLAYING ENERGY-RELATED INFORMATION

CROSS-REFERENCE TO RELATED APPLICATIONS

This application claims priority under 35 U.S.C. §119(e) to U.S. Provisional Application No. 60/987,143 filed on Nov. 12, 2007, which is hereby incorporated by reference.

TECHNICAL FIELD

This disclosure relates generally to energy usage systems and more specifically to an apparatus and method for displaying energy-related information.

BACKGROUND

One of the major expenses for many enterprises and other entities is the cost of energy. Energy analysts are often used to identify areas where energy expenditures can be reduced or minimized. Energy analysts often attempt to control energy expenditures using a set of charts and reports detailing the energy consumption of various "sites" (areas or objects within an enterprise or other entity). These reports may include ordered lists of best-performing and worst-performing sites within the enterprise or other entity. These reports may also include graphs of raw or normalized energy consumption and graphs comparing sites. Finding patterns and other useful information from these reports can often be a time-consuming process.

SUMMARY

This disclosure provides an apparatus and method for displaying energy-related information.

In a first embodiment, an apparatus includes a memory configured to store energy-related information associated with multiple elements in a hierarchically-arranged domain. The apparatus also includes a processing system configured to determine a value of an energy-related metric for each of the elements using the energy-related information, generate a graphical user interface using the metric values, and present the graphical user interface to a user. The graphical user interface includes a treemap having multiple sections, where each section is associated with one of the elements. The graphical user interface also includes a graph displaying energy-related information associated with a selected one of the elements.

In particular embodiments, each section in the treemap has a size and a color, and the size and/or the color of each section is based on the metric value for that section's associated element. For example, the size of each section in the treemap could be based on a size of the associated element, an importance of the associated element, an average energy usage of the associated element, and/or an absolute energy usage of the associated element. A color and a color intensity of each section in the treemap could be based on the metric value of the associated element and/or a comparison of the absolute energy usage to a baseline.

In other particular embodiments, the graph displaying the energy-related information associated with the selected element could include a daily usage plot displaying energy usage by the selected element versus time for each of a specified number of days. The graph displaying the energy-related information associated with the selected element could also include a variance plot displaying (i) energy usage by the selected element versus temperature for each of a specified number of days and (ii) bins defining temperature ranges and identifying variations of the energy usage within the temperature ranges. The graph displaying the energy-related information associated with the selected element could further include a daily trend summary having multiple shaded areas graphically identifying energy usage by the selected element for each of a specified number of days.

In yet other particular embodiments, the elements in the hierarchically-arranged domain include physical areas, equipment components, and/or sensors. When the elements in the hierarchically-arranged domain include physical areas, the graph displaying the energy-related information associated with the selected element could include highlighted and non-highlighted areas defining occupied and unoccupied times for the physical areas.

In still other particular embodiments, the processing system is further configured to generate a mosaic plot, a time-series plot, and/or an XY scatter plot.

In a second embodiment, a method includes receiving energy-related information associated with multiple elements in a hierarchically-arranged domain. The method also includes determining a value of an energy-related metric for each of the elements using the energy-related information. The method further includes generating a graphical user interface using the metric values. The graphical user interface includes a treemap having multiple sections, where each section is associated with one of the elements. The graphical user interface also includes a graph displaying energy-related information associated with a selected one of the elements. In addition, the method includes presenting the graphical user interface to a user.

In a third embodiment, a computer readable medium embodies a computer program. The computer program includes computer readable program code for receiving energy-related information associated with multiple elements in a hierarchically-arranged domain. The computer program also includes computer readable program code for determining a value of an energy-related metric for each of the elements using the energy-related information. The computer program further includes computer readable program code for generating a graphical user interface using the metric values. In addition, the computer program includes computer readable program code for presenting the graphical user interface to a user. The graphical user interface includes a treemap having multiple sections, where each section is associated with one of the elements. The graphical user interface also includes a graph displaying energy-related information associated with a selected one of the elements.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2 through 11 illustrate example graphical user interfaces for displaying energy-related information according to this disclosure.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
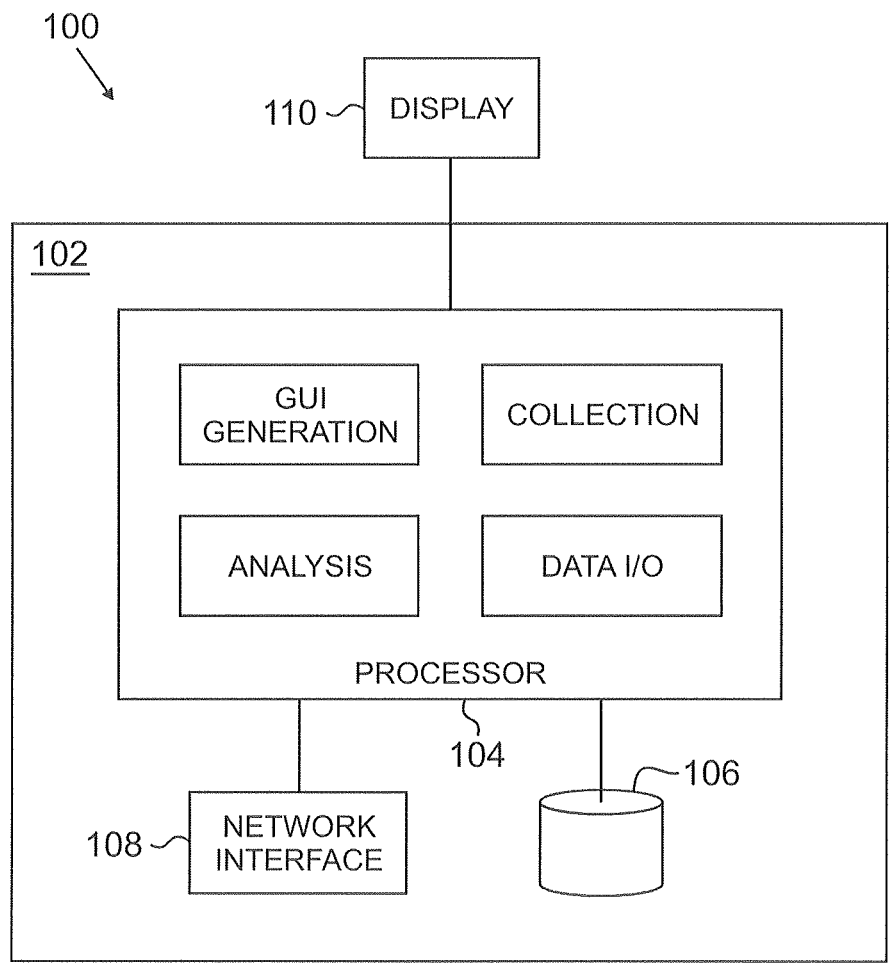
FIG. 1 illustrates an example apparatus for displaying energy-related information according to this disclosure.

FIG. 1 illustrates an example apparatus 100 for displaying energy-related information according to this disclosure. The embodiment of the apparatus 100 shown in FIG. 1 is for illustration only. Other embodiments of the apparatus 100 could be used without departing from the scope of this disclosure.

As shown in FIG. 1, the apparatus 100 includes a processing system 102 for processing energy-related data and generating graphical displays. The term "energy" may represent any suitable utility, such as electricity, gas, cold water, hot water, or steam. The processing system 102 in this example includes at least one processor 104, at least one network interface 106, and at least one memory 108. The processor 104 processes the energy-related data and generates the graphical displays. The processor 104 includes any suitable processing or computing component.

The memory 106 is coupled to the processor 104. The memory 106 can be used to store instructions and data used, generated, or collected by the processor 104. The memory 106 could, for example, store the energy-related data collected and analyzed by the processor 104 and any analysis results generated by the processor 104. The memory 106 could represent any suitable volatile and/or non-volatile storage and retrieval device or devices.

The network interface 108 can support communication with external components, such as an external database or external sensors. The network interface 108 could, for example, receive temperature readings from temperature sensors, energy usage readings from energy meters, or any other or additional energy-related data. The network interface 108 includes any suitable structure for facilitating communications over at least one network, such as an Ethernet interface or a wireless transceiver.

At least one display 110 is coupled to the processing system 102. The display 110 can present various information to one or more users. For example, the display 110 could present one or more graphical user interfaces containing graphs or other information related to energy usage. This may allow, for example, energy analysts or other personnel to review the analysis results and identify energy-related problems with an enterprise or other entity. The display 110 could represent any suitable display device, such as a liquid crystal display (LCD), cathode ray tube (CRT) display, or light emitting diode (LED) display.

In this example, the processor 104 performs various functions for supporting the collection and analysis of energy-related data. For example, the processor 104 supports data input/output (I/O) functions to support communication with other components, such as input devices (like a mouse or keyboard) and output devices (such as the display 110). The processor 104 could also perform collection functions to collect data related to the energy usage of one or more enterprises. The processor 104 could further perform analysis functions to analyze the collected data, such as cost-savings calculations and normalization functions. In addition, the processor 104 could perform graphical user interface generation functions to generate one or more graphical user interfaces for presentation to one or more users. The contents of the generated graphical user interfaces could depend, at least in part, on the analysis performed by the processor 104. Example graphical user interfaces are shown in FIGS. 2 through 11, which are described below. Each of these functions could be implemented using any suitable hardware, software, firmware, or combination thereof.

The apparatus 100 shown in FIG. 1 could be used in a larger system, such as a process control system used to control one or multiple industrial facilities. In these embodiments, the apparatus 100 could communicate with sensors, controllers, servers, or historians in the process control system to gather data for analysis. These communications could occur over Ethernet or other wired or wireless network(s). Also, in these embodiments, the apparatus 100 could represent any suitable device in the process control system, such as a server or operator station. In other embodiments, the apparatus 100 could analyze data from multiple enterprises, and data for each enterprise could be provided to the apparatus 100 or retrieved by the apparatus 100 in any suitable manner.

In one aspect of operation, the apparatus 100 analyzes energy-related data and provides graphical interfaces based on the analyses to energy analysts or other personnel. For example, the apparatus 100 could receive and analyze data associated with a commercial building domain, such as for an entity having multiple individual locations or "sites." However, this concept is also applicable to other situations, such as for single building owners (residential and institutional buildings), as well as industrial installations. Any domain where energy use is an operating cost could benefit from this technology. Also, the apparatus 100 could be used to analyze any suitable energy-related aspects of that domain, such as energy financial costs, an entity's carbon footprint, an entity's carbon emissions, or an entity's carbon production.

In some embodiments, the apparatus 100 provides improved data visualizations (graphical displays) for energy analysts or other users, which may be useful in detecting and diagnosing problems in energy use. For example, a visualization may integrate all of the reports and graphs used by a user into a single interactive display. Depending on the implementation, this visualization may have the following features (which are described more fully below): integration of different displays, linking of treemap rectangles to detailed information for specific sites (areas or objects associated with energy usage), integration of alarm and service history, linking of views, and providing a "small multiple" style month view (although time periods other than a month could be used).

The apparatus 100 may also use a set of performance metrics in the data visualizations, where the metrics serve to highlight potential energy use problems in a building or other area. A user may be able to select one of those measures, which can then be used to drive the integrated display of charts. These metrics can be applied to analyze energy performance over a selected period of time. The period of time could be a month or other suitable time frame, and the time period could also be a user-selectable period. This may be useful, for example, in examining specific periods of interest, such as just before and after a service call or problem resolution.

It may be noted that energy units described below are typically given in certain measurements, such as watt hours (Wh) or kilowatt hours (kWh). However, other suitable values could be used. For example, some control systems export data from electrical current transducers, which give an instantaneous value in watts (W), so the metrics can be expressed in W or Wh. Also, some metrics (such as "deviation from historical performance" and "compared to best in show") may be measures of energy cost variance from a historical mean (which could be based on the energy tariff at a particular site). Other metrics may be measures of energy use intensity. Both cost- and energy-based metrics may be needed for an analyst to successfully manage an enterprise or other entity's total energy cost.

In these embodiments, energy deviation can be represented in various forms, such as cost, use intensity, or carbon production. The use of historical and cross-site comparison data enables calculation of usage variance, such as from past performance (baselining) or against a "similar" site (benchmarking). With usage variance data that includes weather normalization, it may be possible to calculate cost avoidance and/or losses associated with energy consumption (an actual or assumed energy tariff can be used for this calculation). Additional metrics that could be used include measures of energy use intensity, and carbon production metrics can readily be calculated from the energy use intensity. Comparisons to historical performance can be made against a specified baseline period. Comparisons to best in show can be made against either the same period or a specified (best in show) baseline period.

Displays for users can include a calculated figure that provides an estimate of the potential "cost avoidance" for a particular site (i.e. the amount of energy cost that can be avoided if the analyst can take steps to bring the site's energy use back to the historical mean or to the "best in show" site). This could be implemented via a tooltip or other appropriate mechanism. Cost avoidance could be expressed in dollars (or other currency) per month or some other suitable unit of time. When analyzing performance in terms of carbon footprint, the metrics could be expressed in terms of "carbon avoidance." This calculation could be based on actual or assumed carbon production intensity by the site's energy provider.

Although FIG. 1 illustrates an example apparatus 100 for displaying energy-related information, various changes may be made to FIG. 1. For example, the apparatus 100 could include any number of processing systems, processors, memories, and network interfaces. Also, the apparatus 100 could be coupled directly or indirectly to any number of displays, and more than one apparatus 100 could be used in a system. In addition, FIG. 1 illustrates one example operational environment where the processing of energy-related data could be used. This functionality could be used with any other suitable device or system.

FIGS. 2 through 11 illustrate example graphical user interfaces for displaying energy-related information according to this disclosure. The graphical user interfaces shown in FIGS. 2 through 11 are for illustration only. Other graphical user interfaces could be used without departing from the scope of this disclosure.

Figure 2:
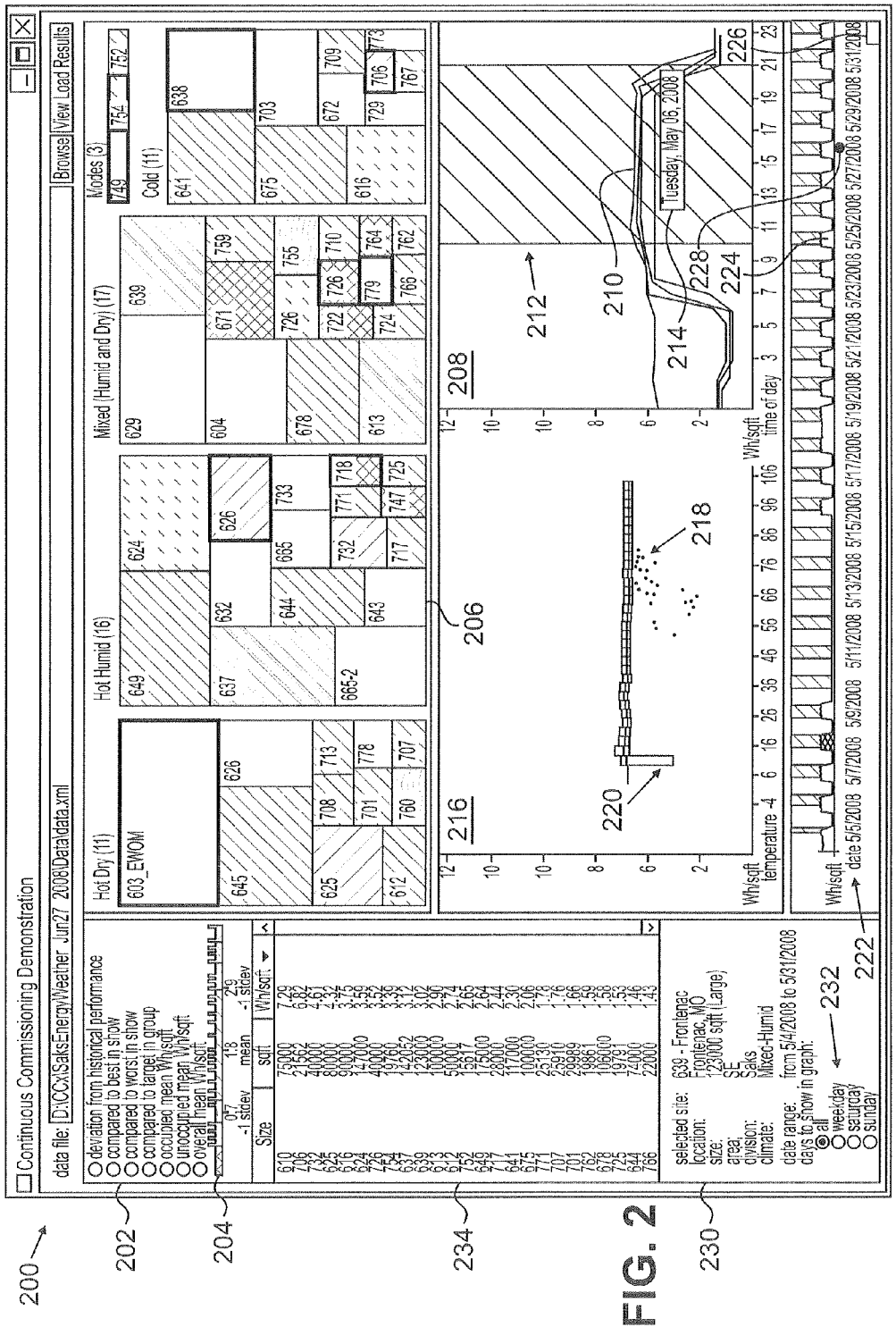

FIG. 2 illustrates an example graphical user interface 200, which displays energy-related information associated with a number of different sites. In this example, the graphical user interface 200 includes a metric selection area 202, which allows a user to select the type of energy metric to be displayed in the graphical user interface 200. The metrics available for selection include deviation from historical performance, meaning each site's energy usage is compared against its own past energy usage. The metrics also include compared to best or worst in show, meaning each site's energy usage is compared against a most or least ideal site (such as a site with a similar size). The metrics further include compared to a target site, meaning each site's energy usage is compared against a specific site in a group. These four metrics could all be normalized by ambient temperature to allow for more accurate cross-site comparisons. In addition, the metrics include occupied, unoccupied, and overall mean energy usage. The occupied versus unoccupied usages refer to usages during times when a site is occupied (such as by employees) or not occupied. Note that any other or additional metric(s) could be provided in the metric selection area 202 for selection. Also note that while a radio button is used to select one of the metrics, any other suitable input mechanism such as a checkbox could be used to select one or more of the metrics.

The metric selection area 202 also includes a legend 204. For the selected metric, the legend 204 identifies how different colors or other indicators correspond to different values of the selected metric. As described below, other areas of the graphical user interface 200 could use the colors or other indicators to denote energy usages in different sites, and the legend 204 provides a point of reference that defines the meanings of those colors or other indicators. As a particular example, the legend 204 could indicate that green colors are used at the lower end of the legend (−1 standard deviation), white colors are used in the central area of the legend, and red colors are used at the upper end of the legend (+1 standard deviation). Note that the legend 204 could use discretely colored areas or colors that continuously vary (such as when lighter red colors transition to darker red colors at the upper end of the legend 204). Also note that the colors displayed by the legend 204 can be chosen dynamically, such as when the colors are based on the mean and standard deviation of the metric values being displayed. This may result in a clean distribution of colors regardless of the selected metric.

The graphical user interface 200 also includes a treemap 206. The treemap 206 displays the properties of hierarchically-arranged elements of a domain. Here, a domain generally refers to a collection of sites, where each site represents an area or object being monitored. Examples of hierarchically-arranged elements and treemaps are also shown in FIGS. 4A through 4C.

Figure 4A:
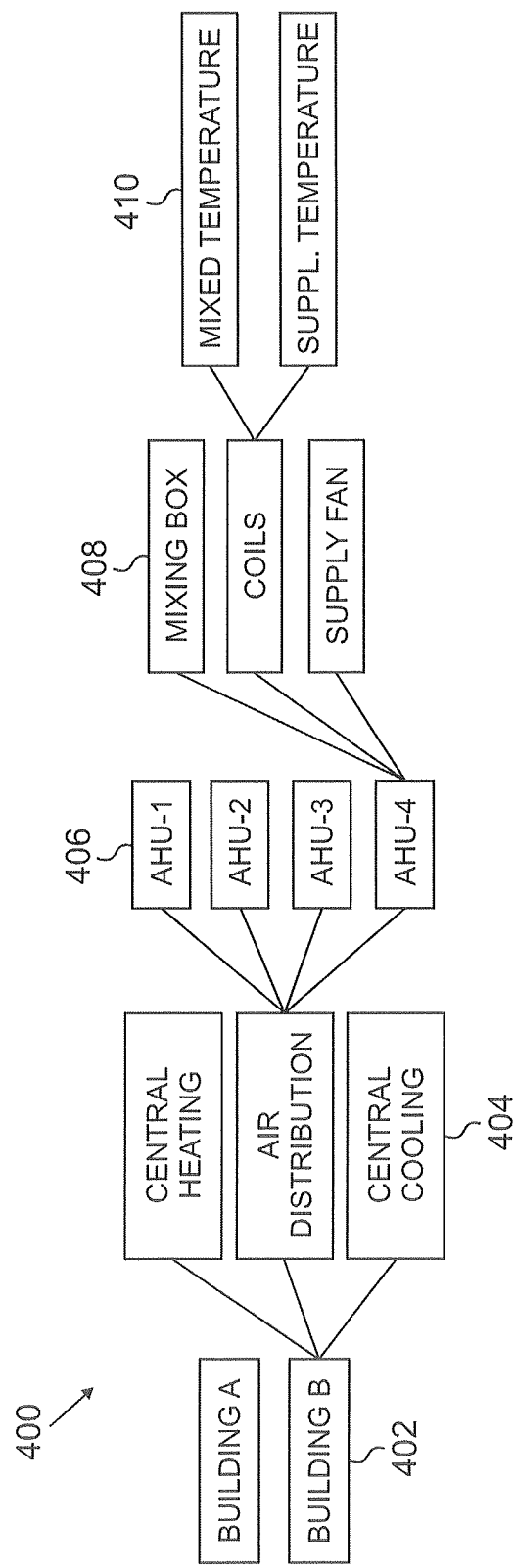

In FIG. 4A, the elements of an enterprise domain are arranged in a hierarchy 400. In this particular hierarchy 400, the hierarchy 400 includes various buildings 402, and each building 402 includes one or more plants 404. Each plant 404 includes one or more pieces of equipment 406, and each piece of equipment 406 has one or more components 408. Each component 408 could have one or more characteristics that can be monitored by meters or other sensors 410.

Figure 4B:
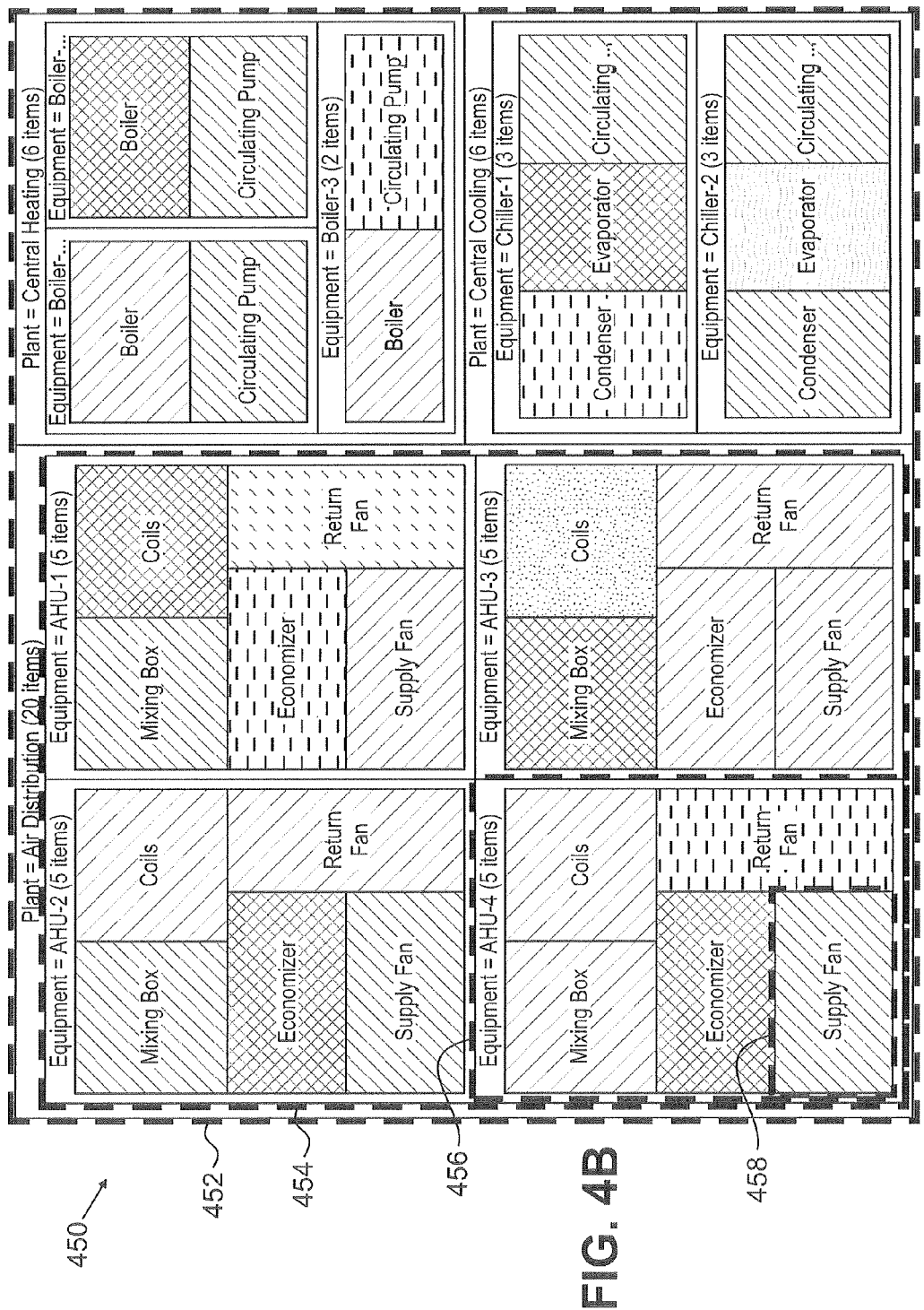

Different levels of the hierarchy 400 are represented in a treemap 450 shown in FIG. 4B. The treemap 450 is divided into different frames and sections. In this example, a frame 452 is associated with one of the buildings 402. The frame 452 includes a frame 454 for each plant 404, and each frame 454 includes a frame 456 for each piece of equipment 406 in that plant. Each frame 456 includes a section 458 representing a component 408 in the associated piece of equipment 406.

Figure 4C:
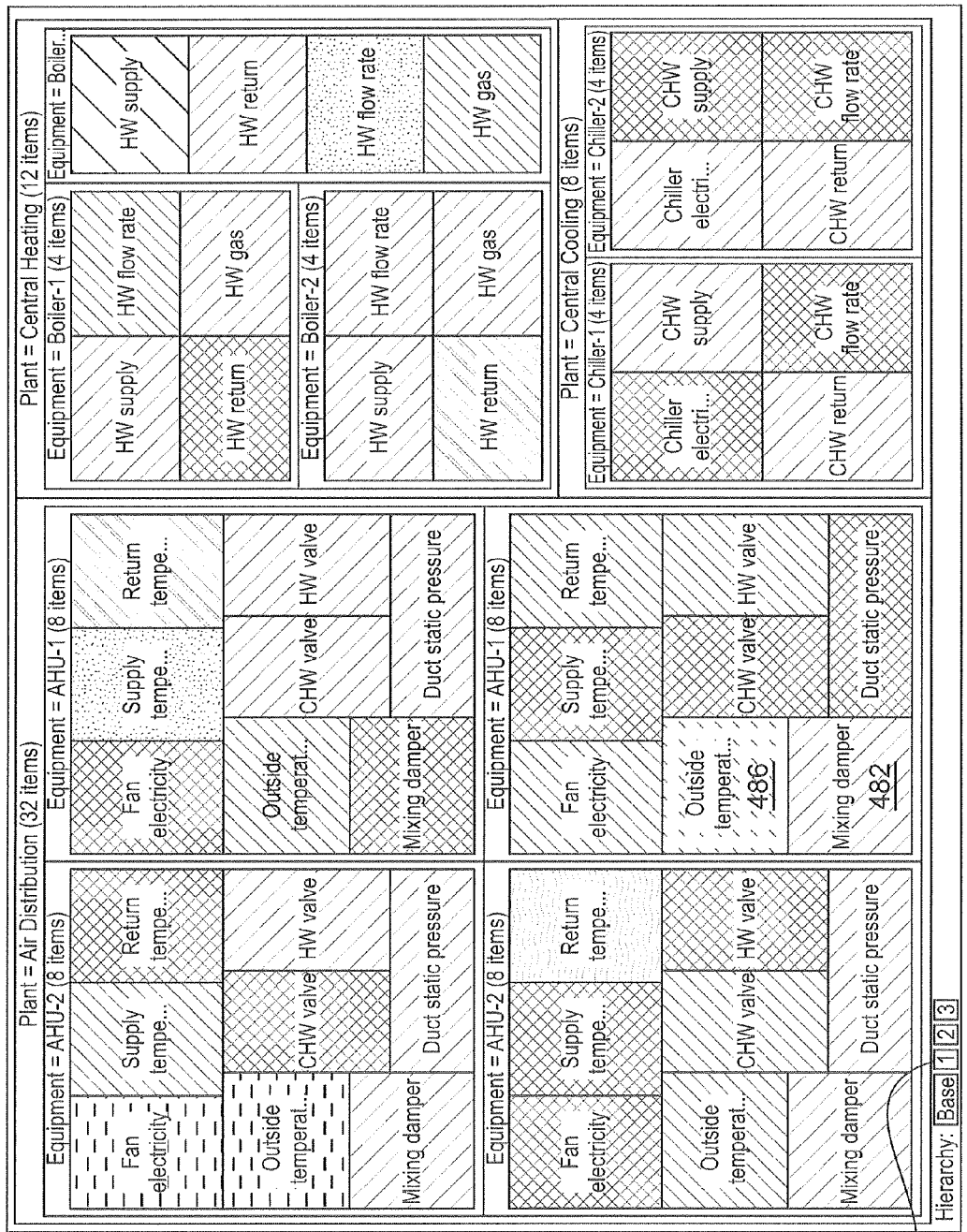

FIG. 4C illustrates another treemap 480, which is again divided into different frames and sections. In this example, the individual sections 482 represent sensors 410 used to collect data associated with various sites. The treemap 480 also includes a control 484 that allows a user to control the level of the hierarchy being displayed.

The treemap 206 in FIG. 2 could have a similar arrangement, even though the treemap 206 is shown as having only the building level in the hierarchy. The hierarchy of physical areas could be enterprise→campus→building→floor→room→zone. The hierarchy of physical areas is also divided according to climate zones (such as when physical areas are grouped into hot humid, hot dry, mixed, and cold areas). Note that any other or additional hierarchical arrangement could be represented by a treemap in the graphical user interface 200.

Each section (rectangle) of the treemap 206 in FIG. 2 has a size and a color, and the size and color can be selected in any suitable manner. The size of each section could, for example, depend on the size of the physical area represented by that section in the treemap 206. In these embodiments, larger rooms or other areas can be represented by larger rectangles in the treemap 206. The size of each section could also depend on the energy usage (such as annual usage) associated with the physical area represented by that section in the treemap 206. In those embodiments, rooms or other areas that use more energy can be represented by larger rectangles in the treemap 206. As described above, the color of each section in the treemap 206 could depend on the value of the selected metric for the physical area represented by that section in the treemap 206. The colors provided in the legend 204 could then be used to color the rectangles in the treemap 206. Alternatively, the color of each section in the treemap 206 could depend on the potential cost saving for each site (which could be calculated based on historical energy usage).

As a particular example, if the site represented by a section in the treemap 206 has an energy usage lower than its historical level or lower than a target site, that section could be colored green. If the site represented by a section has an energy usage higher than its historical level or higher than a target site, that section could be colored red. If the site represented by a section has an energy usage around its historical level or around a target site's usage, that section could be colored white.

The graphical user interface 200 further includes various graphs illustrating one or more sites' energy usage. In FIG. 2, a graph 208 illustrates the daily energy usage over a specified time period for a selected site. The site could be selected, for example, by a user clicking on or otherwise selecting a section of the treemap 206. In this example, the graph 208 includes multiple lines 210, where each line 210 is associated with a daily energy profile. Here, the graph 208 plots the daily energy usage of a specified site for a four-week period and plots the watts per square foot versus time of day (the $W/ft^2$ metric is selected in the metric selection area 202). The graph 208 also includes a highlighted area 212, which illustrates the "occupied" times when the selected site is occupied (such as during working or open hours). Individual lines 210 can be selected or "moused over" by a user, and a label 214 can appear identifying the currently selected line 210.

Another graph 216 plots normalized energy consumption of a selected site versus temperature. The graph 216 includes dots 218 that represent the actual energy consumption for the selected site. The number of dots 218 could depend on the time period for which energy consumption is being displayed, which could be a user-configurable parameter. The graph 216 also includes bins 220, which divide the graph 216 into different temperature ranges. In this example, each bin 220 has a width that covers three degrees of temperature. Also, each bin 220 has a height that identifies the variability of the energy consumption for temperatures within that bin 220. Shorter bins 220 generally denote temperatures where energy consumption remains relatively stable (less variability), while taller bins 220 generally denote temperatures where energy consumption is more unstable (more variability). It may be noted that there are other techniques for estimating mean and variance of energy consumption, such as using local estimation techniques as moving weighted average or using local polynomial regression. Also, there can more independent variables than just ambient temperature in the graph. For instance, adding a time-of-day (TOD) axis could results in a three-dimensional graph (temperature versus time of day versus energy).

A daily trend summary 222 is located along the bottom of the graphical user interface 200. In this example, the daily trend summary 222 graphically illustrates the daily energy usage of a selected site over a specified time period. Here, each day identified in the daily trend summary 222 includes a shaded or other area 224 defining the energy usage in the site during that day, along with highlighting to illustrate the occupied times of the site. A user could select one or multiple days from the daily trend summary 222, and one or more lines 210 in the graph 208 could be highlighted (such as by using thicker lines or lines with color). The label 214 can then be used to identify a particular selected day, and a scroll bar 226 could be used to navigate forward or backyard in time. Also, indicators 228 could be used to identify different events, such as a service call that may affect energy consumption in the selected site.

Text 230 identifies a selected site, and controls 232 can be used to control the energy consumption data displayed in the graphs. In this example, a user could view energy consumption for weekdays, Saturdays, Sundays, or all days using the controls 232.

In addition, the graphical user interface 200 includes a metrics area 234. The metrics area 234 presents in tabular or list form a metric value for each site identified in the treemap 206. In this example, the sites are identified by site number, and the square footage and selected metric (overall mean energy usage per square foot) are listed in the metrics area 234. Of course, any other or additional information could be displayed in the metrics area 234. Also, the metric information displayed in the metrics area 234 is controlled by the selection made in the metric selection area 202.

In one aspect of operation, the apparatus 100 could generate and present the graphical user interface 200 to a user. The graphical user interface 200 could initially contain the treemap 206 (possibly with or without color, depending on whether a metric is pre-selected in the metric selection area 202). When the user selects a particular metric in the metric selection area 202, the apparatus 100 can compute or retrieve the appropriate metric for each site and update the treemap 206 with the appropriate colors. The apparatus 100 can also update the metrics area 234 with values for the selected metric. If the user selects a particular site (either in the treemap 206 or in the metrics area 234), the graphs 208 and 216 can be generated and presented, as well as the daily trend summary 222 for that site. The user can also select other sites, review the data, and identify any problems or areas of concern. The user could also select other metrics to review.

Among other things, the graphical user interface 200 can allow various users to review energy-related analyses and identify problems at one or more sites. For example, the treemap 206 can be used to make inter-site comparisons, and the various graphs can be used to perform site-specific analyses. Also, information can be added to the display to provide further annotation about the information being depicted.

Figure 3:
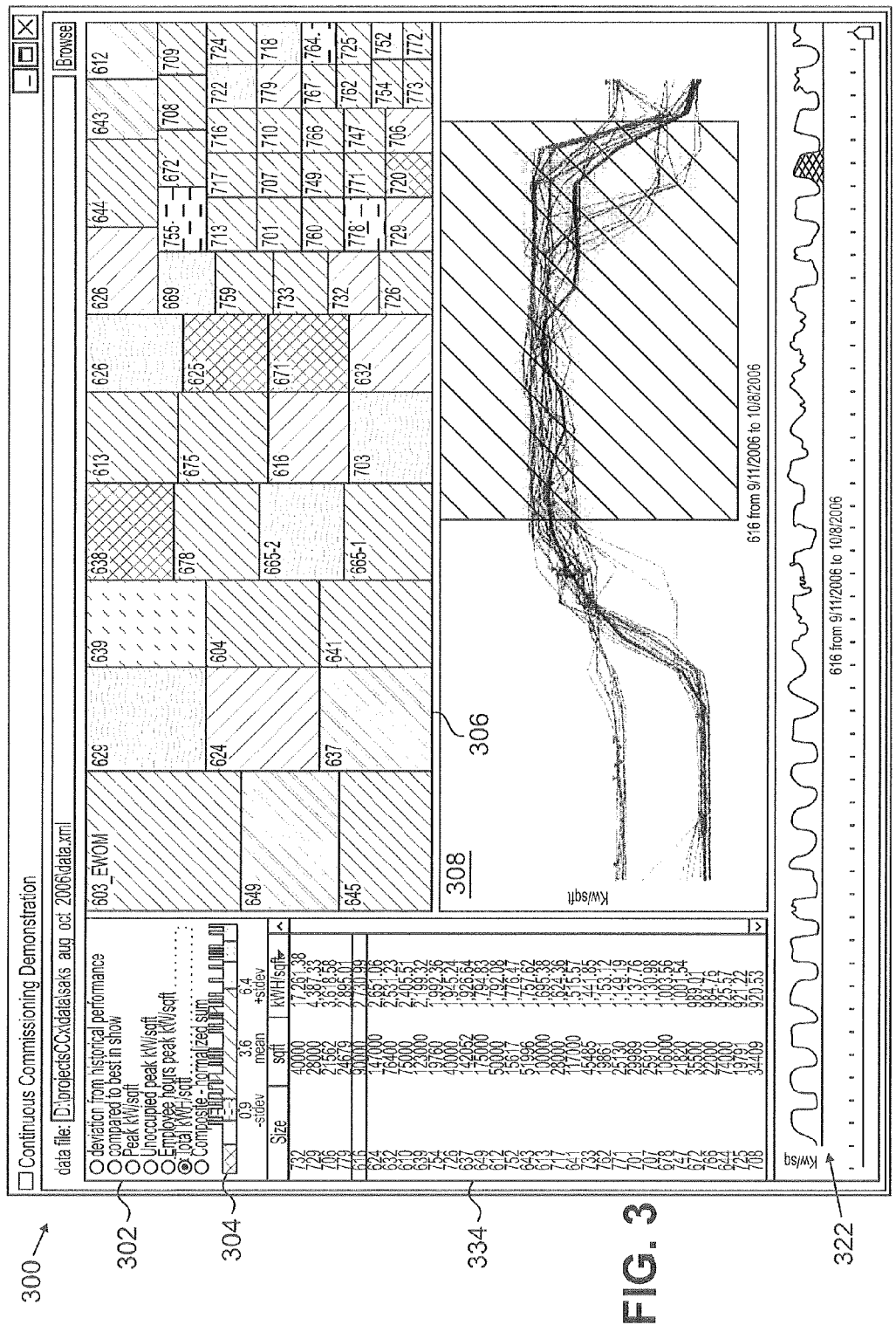

FIG. 3 illustrates another example graphical user interface 300, which is similar to the graphical user interface 200 of FIG. 2. Here, the graphical user interface 300 includes a metric selection area 302, a legend 304, a treemap 306, a graph 308, a daily trend summary 322, and a metrics area 334. The metric selection area 302 contains metrics for selection by a user, some of which are also available in FIG. 2 (except the metrics are expressed in kilowatt hours). The metric selection area 302 also contains two additional options (peak energy consumption and composite normalized view). Note that the colors displayed by the legend 304 can be chosen dynamically, such as when the colors are based on the mean and standard deviation of the metric values being displayed. In this example, the graphical user interface 300 omits a variance plot (such as graph 216).

A site may be selected at any time in the graphical user interface 300, such as by using the treemap 306. When a site is selected, its daily energy consumption can be graphed below the treemap 306 in the graph 308. In this example, one line in the graph 308 can be highlighted by selecting a corresponding day in the daily trend summary 322. Highlighting (such as mousing over) a day in either the graph 308 or the daily trend summary 322 may change the color associated with that day in both graphs.

Additional functionality could also be provided in the graphical user interfaces 200 and 300. For example, alarms and service calls can be identified in the interface 300, such as by using the indicators 228 in the daily trend summary 322. These indicators could be color-coded (such as preventive maintenance visits in green and emergency visits in red). Mouse-over components can be used to describe each of the alarm or service calls. Also, unoccupied, occupied, or other metrics can be calculated, and data can be loaded from any suitable source (such as from a MICROSOFT ACCESS database, MICROSOFT EXCEL spreadsheet, MICROSOFT SQL SERVER, a general data warehouse, and/or a web services data source). When no site is selected, complete traces for all sites can be stacked in the various graphs. Other functions can include the presentation or inclusion of a monetized/savings perspective, the inclusion or use of raw dollar (or other currency) values, and the use of raw (non-normalized) data. Further, reporting functionality could be provided. Possible reports could include a list of the top ten best or worst sites, drill down and print graphs, and analysts' comments. "Copy to clipboard" capabilities could also be provided. In addition, potential cost-saving calculations may involve normalization calculations and selection of consumption components that relate to cost. The cost-savings calculations and an algorithm for normalizing energy consumption can be supported by appropriate database queries, and ongoing weather data can be considered in the calculations/algorithm.

As noted above, the treemaps 206 and 306 displayed in the graphical user interfaces 200 and 300 could be used to identify sites in any suitable hierarchical system. In FIGS. 2 and 3, for example, the treemaps are used to identify physical areas (such as rooms or zones) in a hierarchical system. While no labels are shown in FIG. 3, labels identifying the different hierarchical level could be added. As shown in FIG. 4B, the treemap 450 is divided into equipment components rather than physical areas, and labels are included identifying the buildings, plants, equipment, and components. The size of each section 458 in FIG. 4B could be fixed or variable. Specific examples include basing the size on the relative importance of each equipment component or their annual or average energy usages.

As shown in FIG. 4C, the treemap 480 is similarly divided into equipment components rather than physical areas, and labels are included identifying the buildings, plants, equipment, and sensors. The size of each section 482 in FIG. 4C could be fixed or variable. In some embodiments, the treemap 480 could also be used to analyze sensor reliability or identify sensor problems (such as sensors needing recalibration). For example, section 486 represents a sensor measuring outside temperature. The entire frame corresponding to "AHU-3" may indicate normal operating conditions except for the sensor represented by section 484 (which may indicate higher than normal outside temperature). Since one would expect higher energy usage when the outside temperature increases, the lack of higher energy usage detected by other sensors may be indicative of a faulty outside temperature sensor. In some embodiments, streams of sensor readings may be validated by the apparatus 100 (such as by an automated signal analysis technique) before the sensor data is used, which allows for the detection of unreliable signals.

Figure 5:
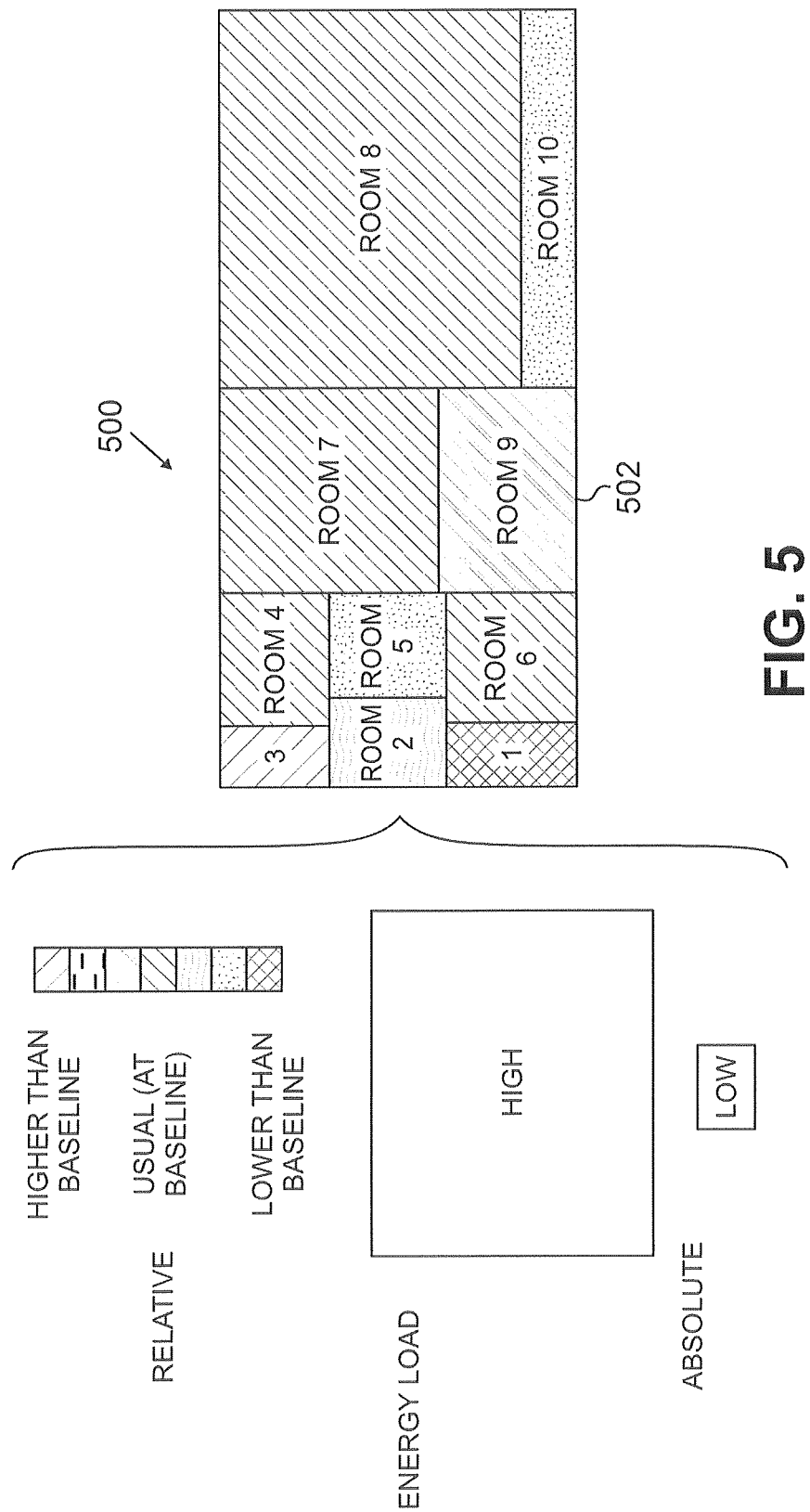

FIG. 5 illustrates an alternate technique for sizing and coloring the sections of a treemap. In this example, a treemap 500 includes multiple sections 502. Here, both the size and color of each section 502 are based on that section's energy consumption. Here, the size of each section 502 is based on the absolute energy consumption of its associated site (a room in this example). Also, the color of each section 502 is based on the energy consumption of its associated site compared to some threshold, meaning the color represents relative energy consumption. This allows the treemap 500 to illustrate both a measure of each site's importance (size) and a measure of any anomaly's direction and intensity (color).

The threshold used to select a color for each section 502 could represent an energy baseline, such as usual absolute electricity consumption, usual absolute heat load, or usual cost for room cooling. Also, the measure of anomaly direction and intensity can be a relative difference (such as a percentage) between the actual energy load and the usual energy load or a ratio of actual energy load/energy baseline and the standard deviation of the energy baseline. In FIG. 5, size is proportional to energy load, color indicates energy position relative to the baseline (such as when red represents being above a baseline and green represents being under a baseline), and color intensity indicates the severity of an anomaly (white means no anomaly and dark means significant anomaly).

Among other things, this technique can be used for visualization of energy monitoring results in hierarchical systems. To be more specific, various results can be visualized, such as energy benchmarking, energy baselining, energy drift detection, and results of other energy-monitoring techniques.

Note that these example treemaps are for illustration only. Any other suitable treemaps could be used to represent the energy consumption of different portions of a hierarchical system.

Figure 6:
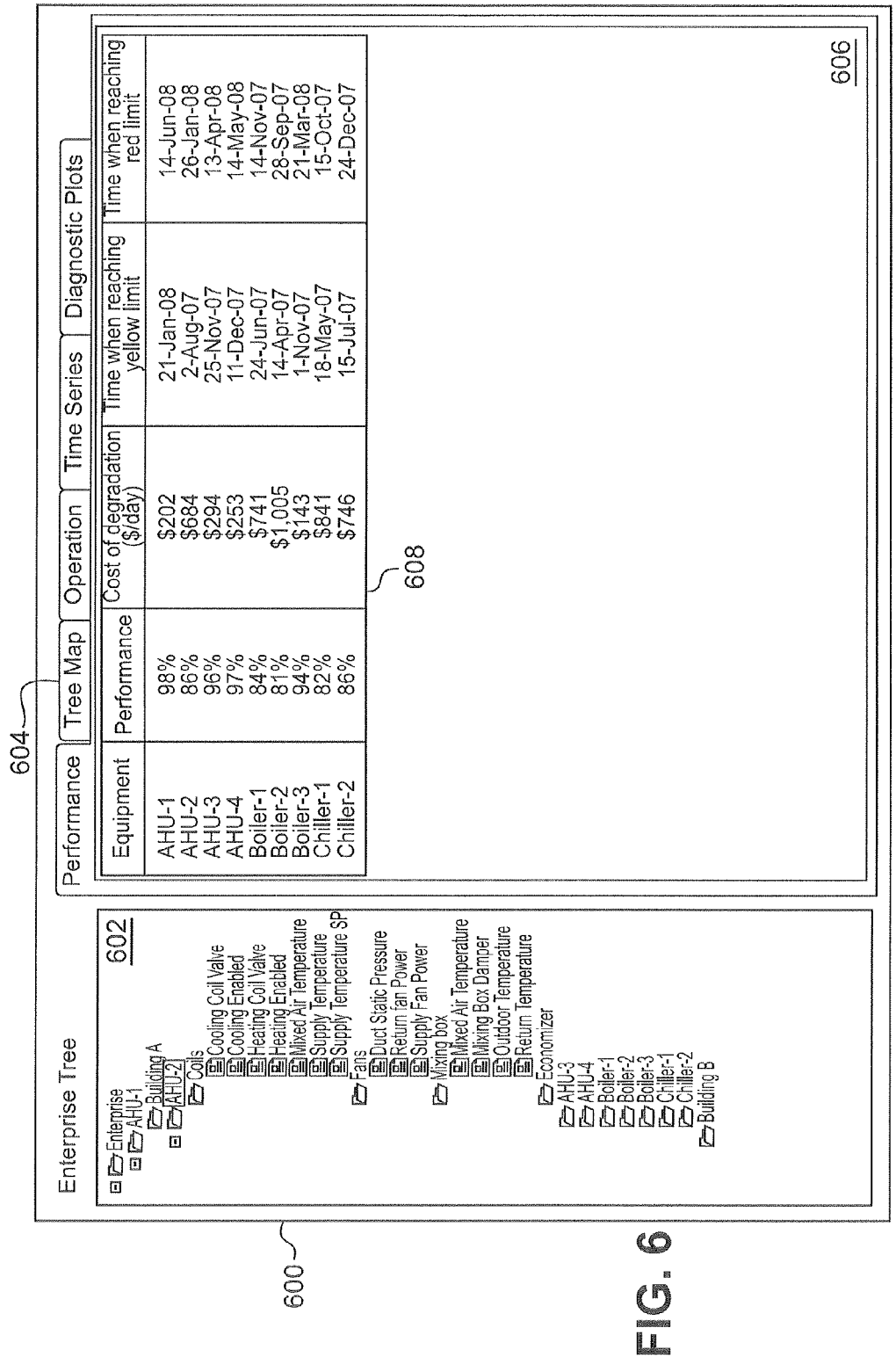

FIG. 6 illustrates another example graphical user interface 600. In this example, the graphical user interface 600 includes an enterprise tree 602, which defines a hierarchy of sites (such as areas or objects/equipment) in an enterprise. The enterprise tree 602 could be arranged in the same hierarchical manner shown in FIG. 4A. A user can navigate through the enterprise tree 602 to select a particular site. Energy-related information for the selected site or multiple sites can be displayed to the user.

In this embodiment, tabs 604 allow the user to select different types of energy-related information to be displayed. This information can range from global information for multiple sites (in the form of tables and treemaps), focused operational information for sites (in the form of mosaic plots), long-term trends for sites (in the form of time-series plots), and site-specific diagnostic plots (in the form of XY scatter plots). The selected type of information is then presented in a display area 606 of the graphical user interface 600. Note that any other suitable information or graphs could be selected.

In FIG. 6, a "Performance" tab 604 is selected, and a table 608 of information is presented to the user. The table 608 includes site names and associated performance values. The table 608 also includes costs of degradation (the costs due to a site not operating at 100%). Times when reaching yellow and red limits (two threshold values) are also identified.

If a "Tree Map" tab 604 is selected in the graphical user interface 600, a treemap can be presented in the display area 606. The treemap could have any suitable form, such as any of the treemaps described above.

Figure 7:
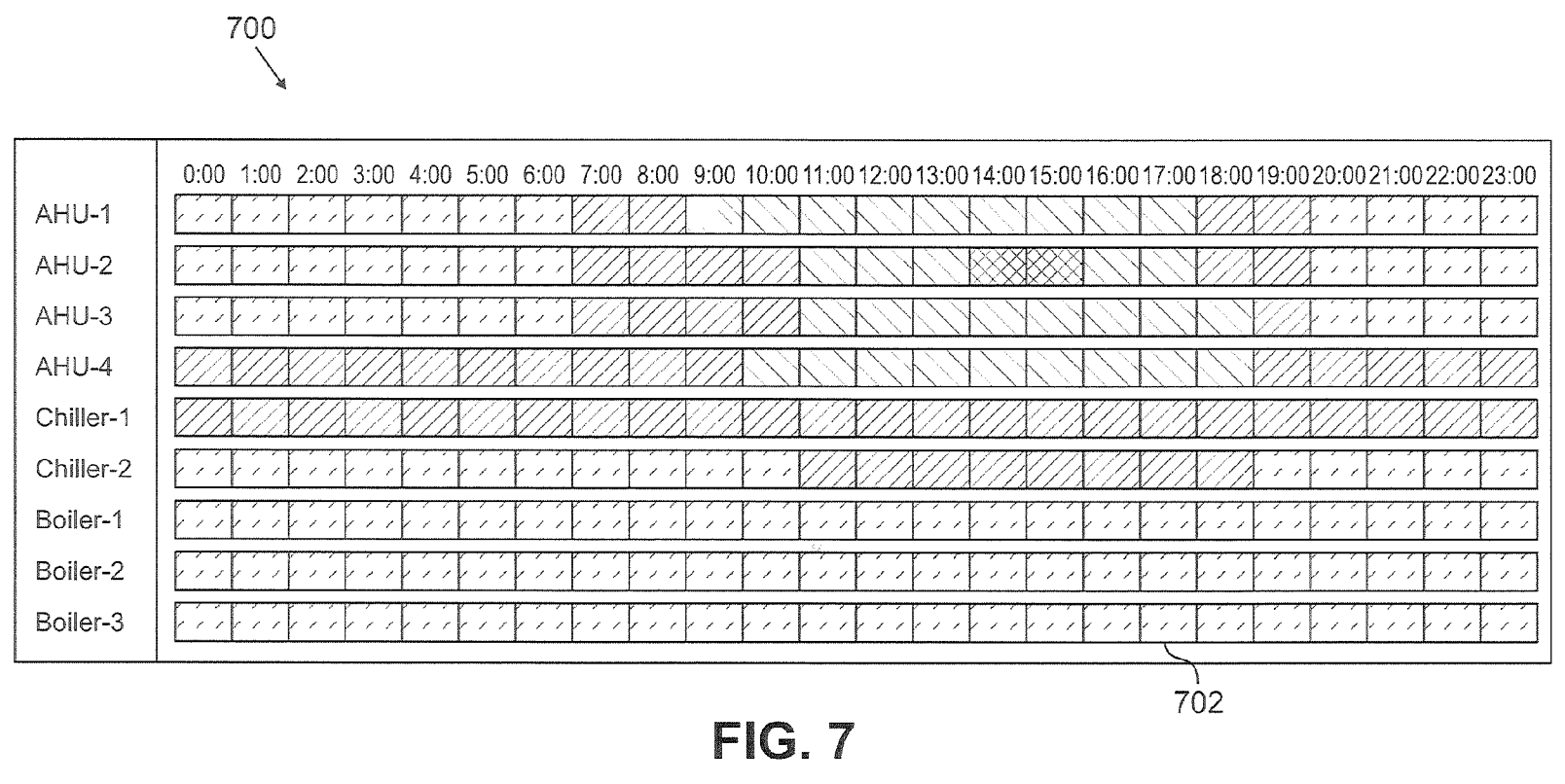

If an "Operation" tab 604 is selected in the graphical user interface 600, a mosaic plot 700 as shown in FIG. 7 can be presented in the display area 606. The mosaic plot 700 includes a number of rows, each row containing multiple indicators 702. Each row here is associated with a different site, and each indicator identifies that site's energy usage during a specified time (such as one hour or other period).

The color of each indicator 702 could indicate the status of the associated site during that time period. For example, yellow could indicate that the associated site (a piece of equipment) was turned off. Green could indicate that the associated site was running, while blue could indicate that the associated site was running in a specific mode. Red could indicate that the associated site is operating in a faulty state, such as when the associated site is consuming too much energy.

Figure 8:
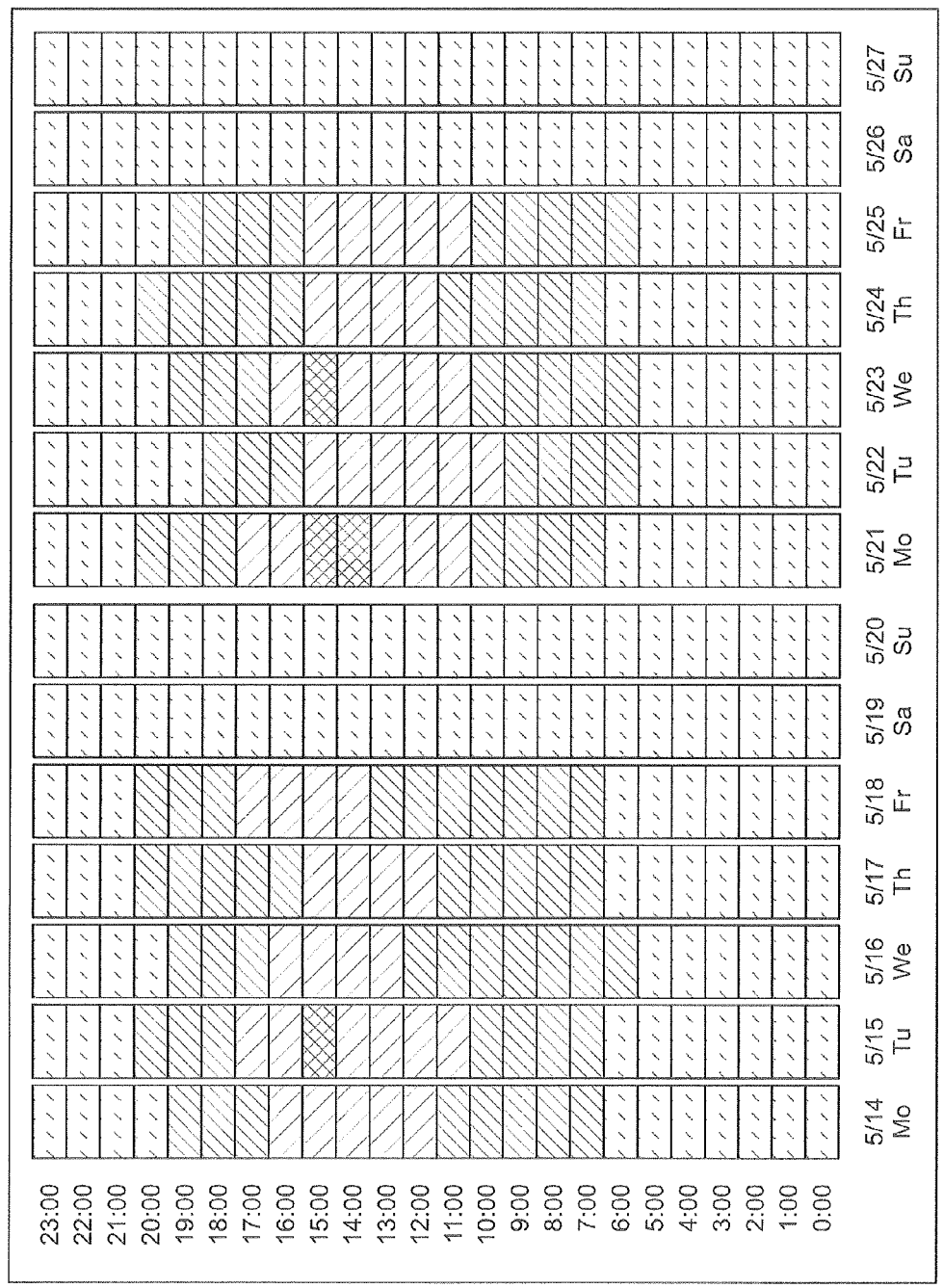

If a user selects a particular site in FIG. 7 (such as by clicking on the name of the site), another mosaic plot 800 shown in FIG. 8 could be presented in the display area 606. The mosaic plot 800 illustrates the operational history of the selected site for a specified time period (two weeks in this case, although the period could be adjustable). Again, indicators in the mosaic plot 800 identify the operational status for each hour of that time period. More specifically, the color of each indicator identifies the operational status of the selected site during an hour.

Figure 9:
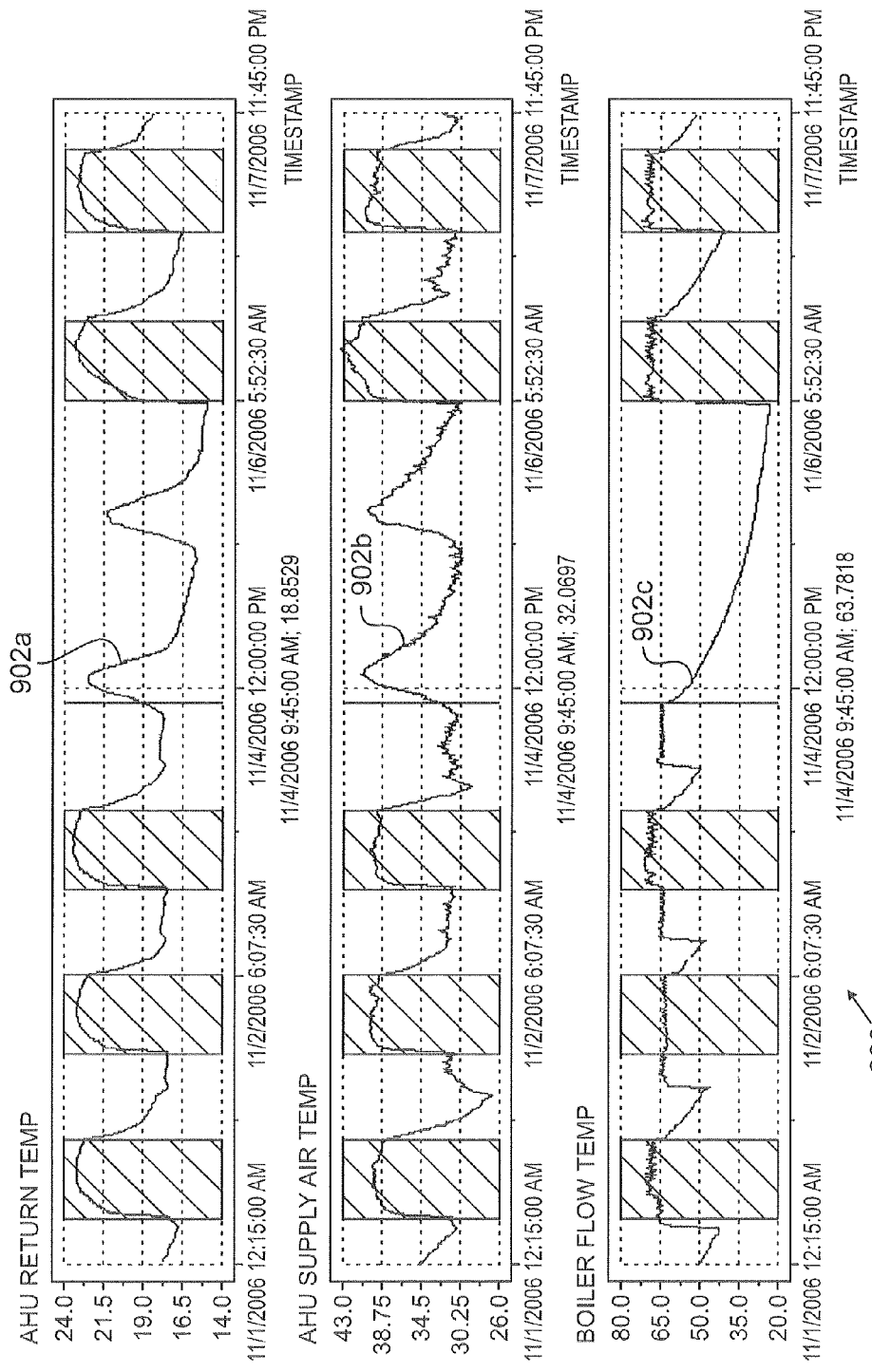

If a "Time Series" tab 604 is selected in the graphical user interface 600, a time-series plot 900 as shown in FIG. 9 can be presented in the display area 606. In this example, the time-series plot 900 includes various lines 902*a*-902*c* that represent a number of sensor variables plotted over time. Background colors in the plot 900 can represent different operating modes, such as times when a site is occupied or unoccupied (and thus times when the site is or is not consuming much energy). Using appropriate controls, a user could zoom in and out to switch between shorter-term and longer-term views in the plot 900.

Figure 10A:
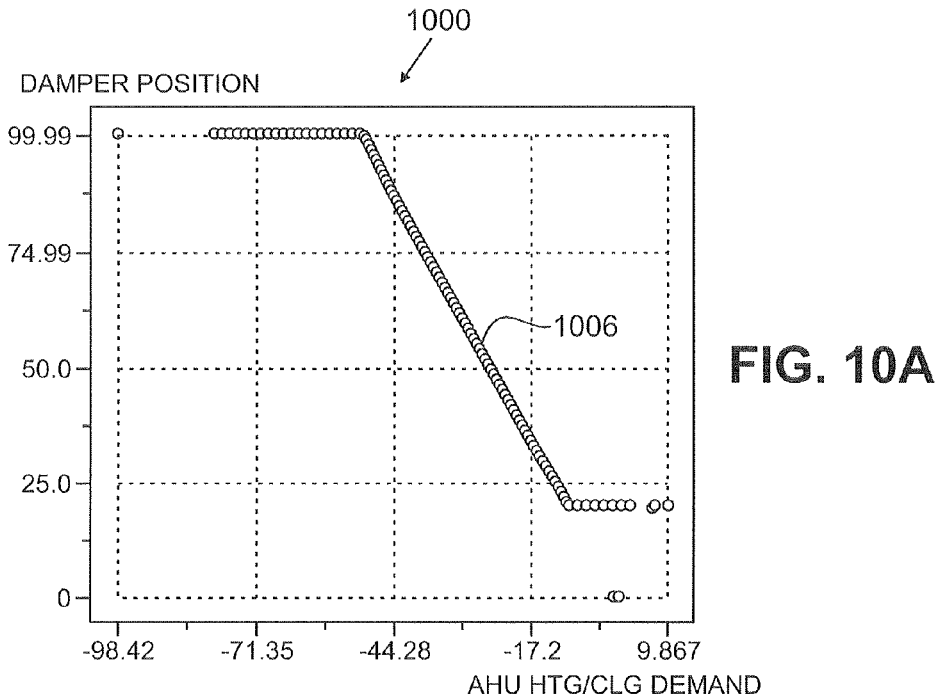
Figure 10B:
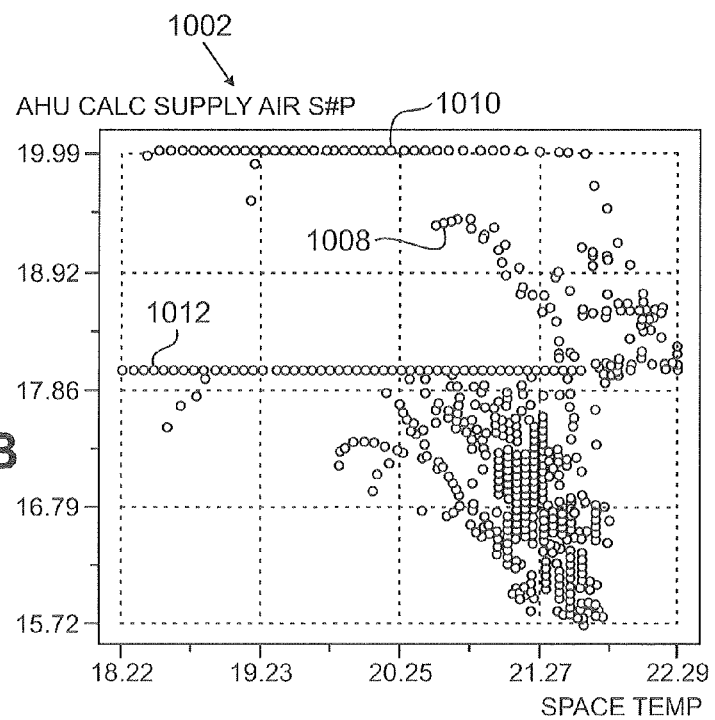
Figure 10C:
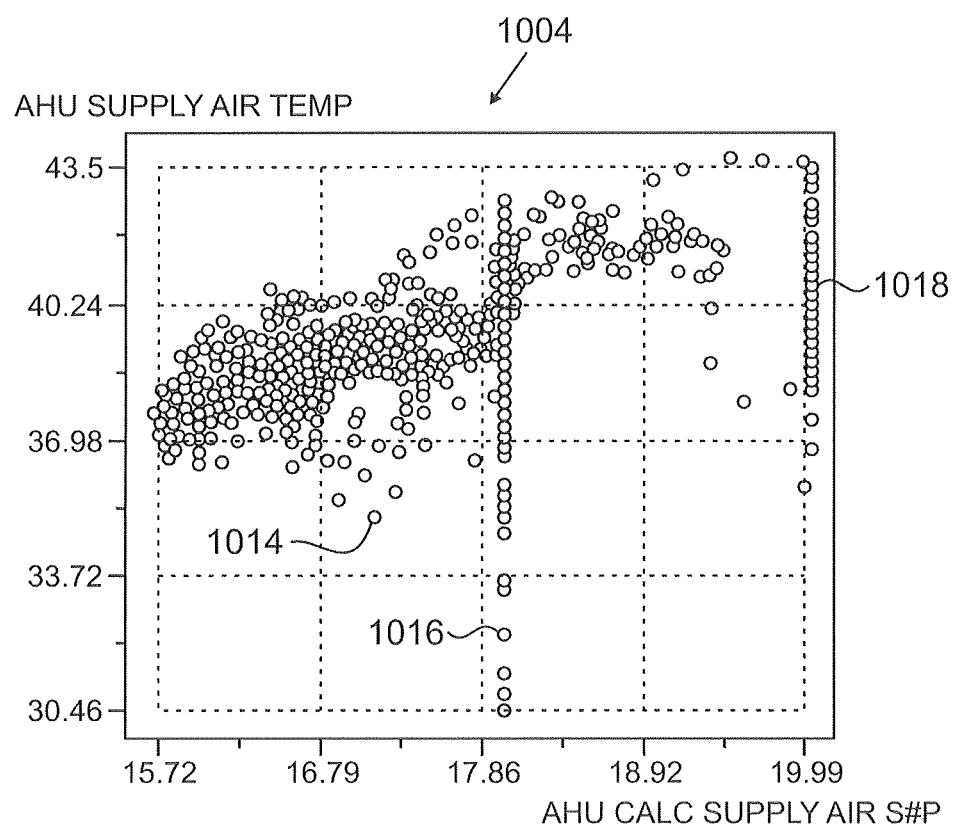
Figure 11A:
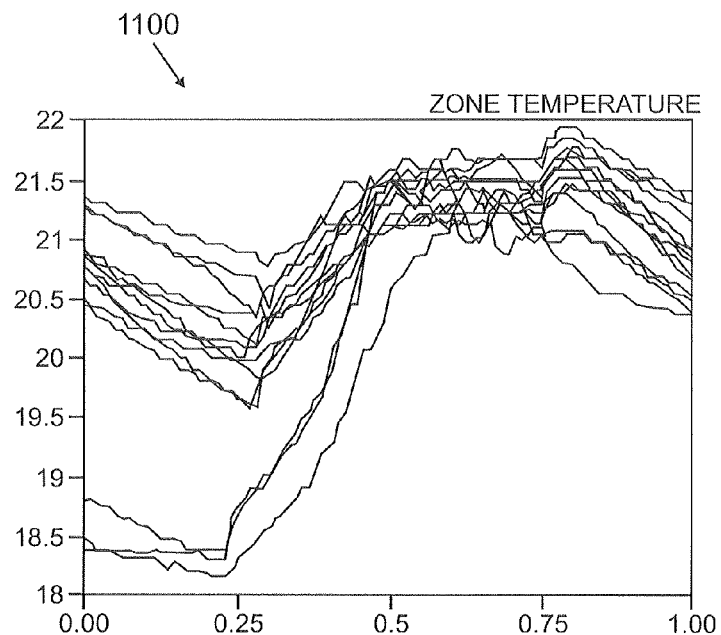
Figure 11B:
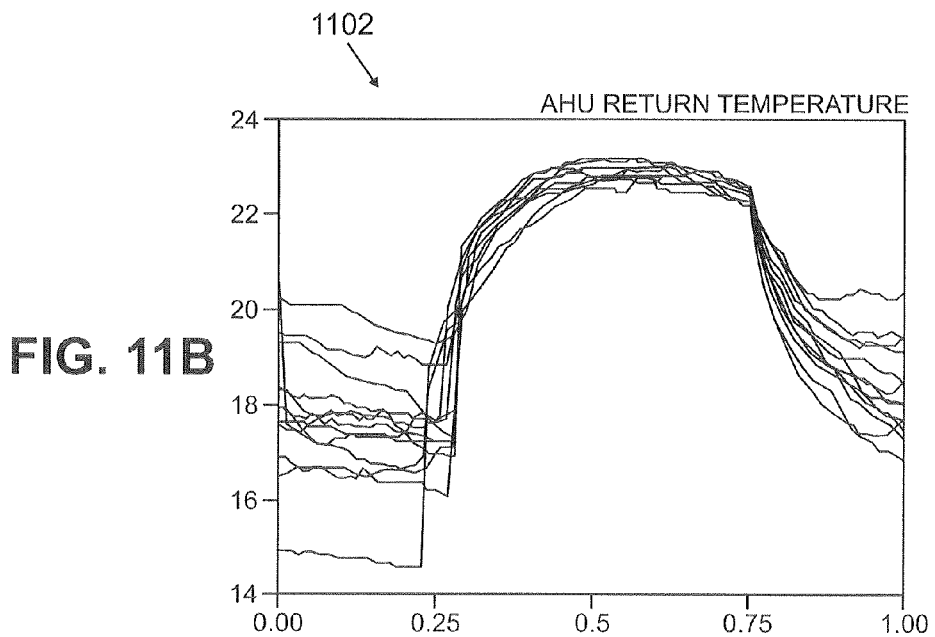

If a "Diagnostic Plots" tab 604 is selected in the graphical user interface 600, various diagnostic plots shown in FIGS. 10A through 11B can be presented in the display area 606. In FIGS. 10A through 10C, diagnostic plots 1000-1004 chart the values of various parameters, such as measured parameters (like sensor data) and control parameters (like computed set points). These plots could be equipment-specified and/or component-specific. Among other things, these plots 1000-1004 can be used to assess behavior of the equipment, its components, and associated control loops. In FIG. 10A, various points 1006 denote the position of a damper in an air handling unit (AHU). In FIG. 10B, various points 1008 denote the values of an air supply setpoint, while points 1010-1012 respectively denote upper and lower bounds. In FIG. 10C, various points 1014 denote the values of an air supply temperature, while points 1016-1018 respectively denote upper and lower setpoint values. In FIGS. 11A and 11B, daily plots 1100-1102 illustrate daily variations in two parameters (zone temperature and return temperature). The daily plots 1100-1102 illustrate the variations in the parameters over time for a specified number of days (such as 28 days). Variations in the plots 1100-1102 indicate how well the system is controlled.

Although FIGS. 2 through 11 illustrate example graphical user interfaces for displaying energy-related information, various changes may be made to FIGS. 2 through 11. For example, features shown in one or more graphical user interfaces described above could be used in other graphical user interfaces described above. As a particular example, the tabs 604 (and associated displays) could be used in the graphical user interfaces 200 and 300. Also, while various input mechanisms (such as radio buttons, enterprise trees, and tabs) have been described, any suitable input mechanisms could be used to receive input from one or more users. In addition, the content, layout, and arrangement of information in the graphical user interfaces are for illustration only. Other or additional information related to energy usage could be presented in these or other graphical user interfaces.

Figure 12:
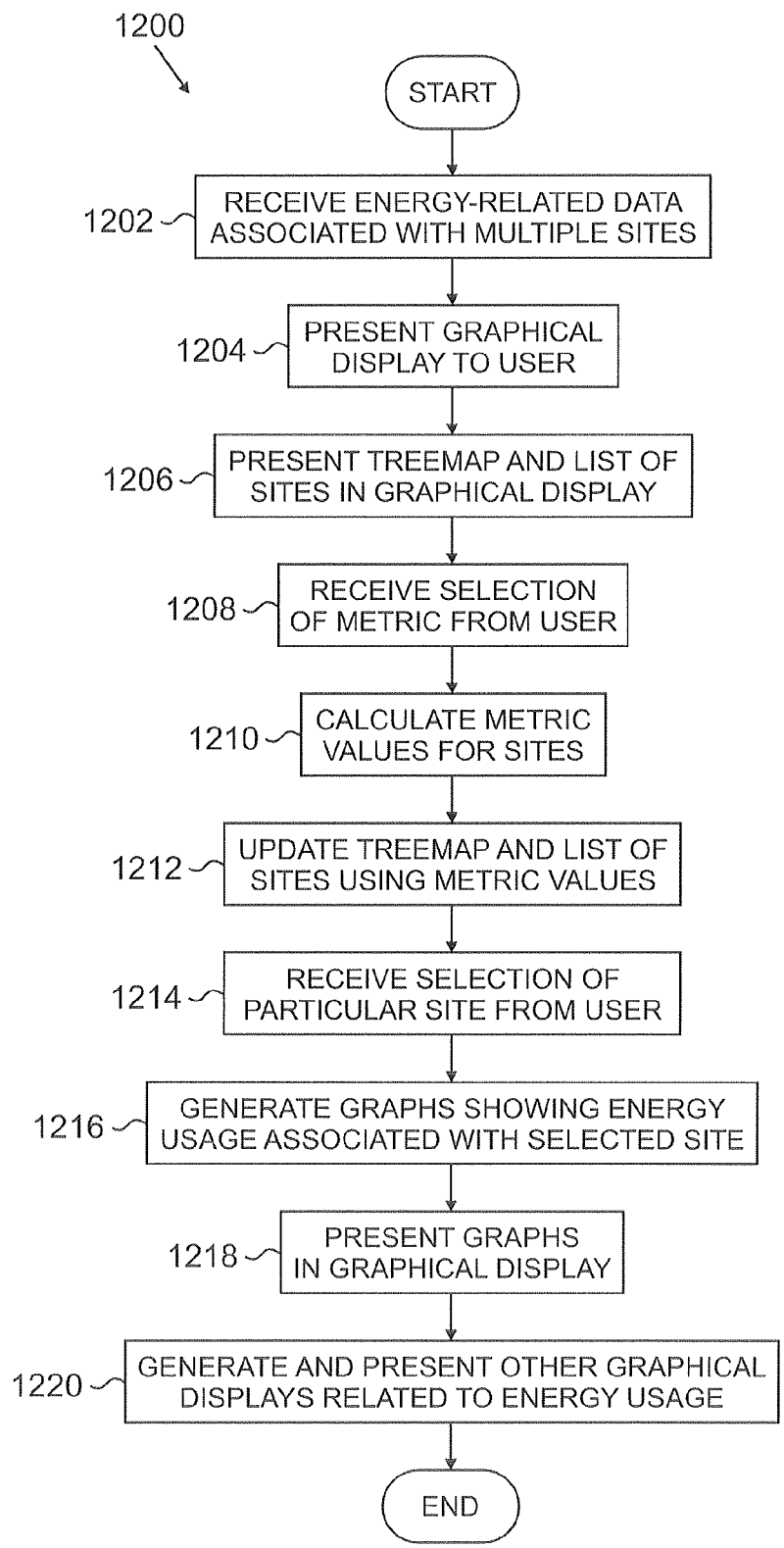
FIG. 12 illustrates an example method for displaying energy-related information according to this disclosure.

FIG. 12 illustrates an example method 1200 for displaying energy-related information according to this disclosure. The embodiment of the method 1200 shown in FIG. 12 is for illustration only. Other embodiments of the method 1200 could be used without departing from the scope of this disclosure.

Energy-related information associated with multiple sites is received at step 1202. This could include, for example, the apparatus 100 receiving the energy-related information from sensors or other devices monitoring energy use at those sites. This could also include the apparatus 100 communicating with one or more information collection systems and receiving the information from those systems. The apparatus 100 could immediately use the energy-related information or store the information in a persistent storage for later use.

A graphical display is presented to a user at step 1204. This could include, for example, the apparatus 100 generating the graphical display 200 or 300 and presenting the generated graphical display on a display 110. A treemap and a list of sites are presented in the graphical display at step 1206. This could include, for example, the apparatus 100 generating a treemap that includes rectangles or other sections associated with the sites. The sizes of the sections could be based on size, importance, annual or average energy usage, absolute energy usage, or any other suitable criteria.

A selection of a metric is received from the user at step 1208. This could include, for example, the user selecting a metric in a list of metrics presented in the graphical display. Metric values for the sites are generated at step 1210. This could include, for example, the apparatus 100 using the received energy-related information to calculate a value of the selected metric for each site. The treemap and list of sites are updated using the metric values at step 1212. This could include, for example, selecting a color for each section of the treemap based on whether a metric value is above or below a threshold (the intensity of the color can be based on the distance from the threshold). This could also include inserting the metric values into the list of sites.

A selection of a particular site is received from the user at step 1214. This could include, for example, the user selecting one of the rectangles in the treemap or selecting one of the sites from the list. One or more energy usage graphs associated with the selected site are generated at step 1216. This could include, for example, the apparatus 100 generating a graph showing daily energy usage at the selected site during a four-week or other time period. This could also include the apparatus 100 generating a normalized variance graph showing how energy usage at the selected site varies by temperature. One or more graphs are presented in the graphical display at step 1218.

One or more additional graphical displays could also be generated and presented to the user at step 1220. The additional graphical displays could include any suitable content, such as mosaic plots, time-series plots, and XY scatter plots. Note that any other or additional graphical displays could be generated and presented here. Also note that these additional graphical displays could form part of the first graphical display or represent separate graphical displays.

Although FIG. 12 illustrates an example method 1200 for displaying energy-related information, various changes may be made to FIG. 12. For example, while shown as a series of steps, various steps in FIG. 12 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an interface configured to receive energy-related information from at least one monitoring device, the energy-related information associated with a plurality of elements in a hierarchically-arranged domain, each element representing one of a plurality of physical areas, one of a plurality of equipment components, or a combination of at least one physical area and at least one equipment component;
a memory configured to store the energy-related information; and
a processing system configured to:
identify energy usage associated with each element;
generate a graphical user interface including a plurality of sections, each section representative of a specified one of the elements and having a size that is based on energy usage associated with the specified element relative to energy usage associated with other elements;
present at least a portion of the graphical user interface to a user; and
generate and present to the user, in response to identifying a selection of one of the sections in the graphical user interface, a graph including energy usage over a period of time for a selected element represented by the selected section,
wherein each section has a color, the size of each section is based on an energy usage by that section's associated element, and a color and a color intensity of each section are based on a comparison of the energy usage by that section's associated element to a baseline energy usage for that section's associated element.

2. The apparatus of claim 1, wherein the graphical user interface comprises:
a treemap comprising the sections; and
one or more graphs including energy-related information associated with one or more of the elements.

3. The apparatus of claim 2, wherein the energy usage associated with each element is one of an annual energy usage or an average energy usage;

4. The apparatus of claim 1, wherein the graph including the energy usage for the selected element comprises:
a daily usage plot including the energy usage for the selected element versus time for each of a specified number of days.

5. The apparatus of claim 1, wherein the graph including the energy usage for the selected element comprises:
a variance plot including (i) the energy usage for the selected element versus temperature for each of a specified number of days and (ii) bins defining temperature ranges and identifying variations of the energy usage for the selected element within the temperature ranges.

6. The apparatus of claim 1, wherein the graph including the energy usage for the selected element comprises:
a daily trend summary including multiple shaded areas graphically identifying the energy usage for the selected element for each of a specified number of days.

7. The apparatus of claim 1, wherein the physical areas include at least one of: enterprises, buildings, and plants.

8. The apparatus of claim 2, wherein the one or more graphs including the energy-related information present information associated with a potential cost avoidance and a potential carbon emission avoidance.

9. The apparatus of claim 1, wherein the processing system is further configured to generate one or more of: a mosaic plot, a time-series plot, and an XY scatter plot.

10. A method comprising:
receiving, from at least one monitoring device, energy-related information associated with a plurality of elements in a hierarchically-arranged domain, wherein each element represents one of a plurality of physical areas, one of a plurality of equipment components, or a combination of at least one physical area and at least one equipment component;
identifying energy usage associated with each element;
generating a graphical user interface including a plurality of sections, each section representative of a specified one of the elements and having a size that is based on energy usage associated with the specified element relative to energy usage associated with other elements;
presenting at least a portion of the graphical user interface to a user; and generating and presenting to the user, in response to identifying a selection of one of the sections in the graphical user interface, a graph including energy usage over a period of time for a selected element represented by the selected section, wherein each section has a color, the size of each section is based on an energy usage by that section's associated element, and a color and a color intensity of each section are based on a comparison of the energy usage by that section's associated element to a baseline energy usage for that section's associated element.

11. The method of claim 10, wherein the graphical user interface comprises:
a treemap comprising the sections; and
one or more graphs including energy-related information associated with one or more of the elements.

12. The method of claim 11, wherein the energy usage associated with each element is one of an annual energy usage or an average energy usage.

13. The method of claim 10, wherein the graph including the energy usage for the selected element comprises at least one of:
a daily usage plot including the energy usage for the selected element versus time for each of a specified number of days;
a variance plot including (i) the energy usage for the selected element versus temperature for each of a specified number of days and (ii) bins defining temperature ranges and identifying variations of the energy usage for the selected element within the temperature ranges; and
a daily trend summary including multiple shaded areas graphically identifying the energy usage for the selected element for each of a specified number of days.

14. The method of claim 10, wherein the physical areas include at least one of: enterprises, buildings, and plants.

15. The method of claim 10, wherein the graph including the energy usage for the selected element comprises highlighted and non-highlighted areas defining occupied and unoccupied times for the physical areas.

16. The method of claim 11, wherein the one or more graphs including the energy-related information present information associated with a potential cost avoidance and a potential carbon emission avoidance.

17. A non-transitory computer readable medium embodying a computer program, the computer program comprising:
computer readable program code for receiving, from at least one monitoring device, energy-related information associated with multiple elements in a hierarchically-arranged domain, each element representing one of a plurality of physical areas, one of a plurality of equipment components, or a combination of at least one physical area and at least one equipment component;
computer readable program code for identifying energy usage associated with each element;
computer readable program code for generating a graphical user interface including a plurality of sections, each section representative of a specified one of the elements and having a size that is based on energy usage associated with the specified element relative to energy usage associated with other elements;
computer readable program code for presenting at least a portion of the graphical user interface to a user; and
computer readable program code for generating and presenting to the user, in response to identifying a selection of one of the sections in the graphical user interface, a graph including energy usage over a period of time for a selected element represented by the selected section, wherein each section has a color, the size of each section is based on an energy usage by that section's associated element, and a color and a color intensity of each section are based on a comparison of the energy usage by that section's associated element to a baseline energy usage for that section's associated element.

18. The computer readable medium of claim 17, wherein the energy usage associated with each element is one of an annual energy usage or an average energy usage.

19. The apparatus of claim 1, wherein the at least one monitoring device comprises at least one of: a temperature sensor and an energy meter.

20. The apparatus of claim 7, wherein one or more equipment component elements form one equipment element, one or more equipment elements form one plant element, one or more plant elements form one building element, and one or more building elements form one enterprises element.

* * * * *

UNITED STATES PATENT AND TRADEMARK OFFICE
CERTIFICATE OF CORRECTION

Page 1 of 1

PATENT NO. : 8,966,384 B2
APPLICATION NO. : 12/259959
DATED : February 24, 2015
INVENTOR(S) : Rye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this
Twenty-seventh Day of October, 2015

Michelle K. Lee
*Director of the United States Patent and Trademark Office*